May 7, 1963    B. R. ADELMAN ETAL    3,088,273
SOLID PROPELLANT ROCKET
Filed Jan. 18, 1960    6 Sheets-Sheet 1

INVENTORS:
BARNET R. ADELMAN
BY HERBERT R. LAWRENCE

ATTORNEY

May 7, 1963  B. R. ADELMAN ETAL  3,088,273
SOLID PROPELLANT ROCKET
Filed Jan. 18, 1960  6 Sheets-Sheet 4

INVENTORS:
BARNET R. ADELMAN
BY HERBERT R. LAWRENCE

ATTORNEYS

INVENTORS:
BARNET R. ADELMAN
BY HERBERT R. LAWRENCE
ATTORNEYS

May 7, 1963  B. R. ADELMAN ETAL  3,088,273
SOLID PROPELLANT ROCKET
Filed Jan. 18, 1960  6 Sheets-Sheet 6

INVENTORS.
BARNET R. ADELMAN
HERBERT R. LAWRENCE

BY

ATTORNEYS

United States Patent Office 3,088,273
Patented May 7, 1963

3,088,273
SOLID PROPELLANT ROCKET
Barnet R. Adelman and Herbert R. Lawrence, Menlo Park, Calif., assignors to United Aircraft Corporation, a corporation of Delaware
Filed Jan. 18, 1960, Ser. No. 3,126
4 Claims. (Cl. 60—35.6)

This invention relates to solid propellant rocket motors. According to one aspect of the invention, a rocket motor is provided which has a tapered configuration. According to another aspect, a rocket motor is provided wherein the motor is divided into a series of segments. According to a preferred embodiment of the invention, a solid propellant rocket motor is provided which is made up of a series of segments, at least some of which segments are tapered. The invention also relates to a novel method of fastening segments together and also to a novel method of testing rocket motors, all of which, together with other aspects of the invention herein contained, are more fully set forth hereinafter.

In the design of a rocket motor, it is important that a substantially constant mass rate of gas flow be maintained along the length of the motor and that the flow rate not exceed certain values to prevent erosive burning, which occurs under conditions of a low ratio of propellant port area to nozzle throat area of the rocket motor. Rocket motors are ordinarily of elongated shape with burning taking place throughout the length of the motor and it is obvious that more gas flows past those portions near the nozzle than flows past those portions near the forward end of the chamber. In order that the value of the mass flow rate not exceed an acceptable value at the port, a lower than permissible flow rate must be provided near the forward end of the chamber when the chamber is shaped in the form of a cylinder. This condition can be partially alleviated in cylindrical rockets by shaping the propellant charge in a suitable form, such as a star with points which decrease in size as one approaches the nozzle end of the rocket. However, the method is applicable only to relatively small rockets, as is graphically illustrated hereafter, since one "runs out of points" near the throat end of the rocket as the rocket becomes large. By making the rocket of tapered configuration so that the casing of the rocket, as well as the propellant port area, tapers from a small forward section to a large aft section, large rockets can be made wherein the gas flow is substantially optimum at all points. In other words, the tapered rocket permits constant mass flow rate regardless of the length of the rocket, enabling one to build rockets of large size. Further, by providing a tapered rocket, the rocket motor can be of superior aerodynamic design in that the tapered motor will have reduced drag, reduced heating effects from air friction and superior aerodynamic stability over a rocket of cylindrical configuration. Since such a rocket has a large aft section for its overall size, more room is provided for nozzles.

As solid fuel rockets become larger in size, they become impractical if made in a single piece. Loads much greater than fifty tons or over 13 feet in smallest dimension are severely limited in transportability. Although it might be possible to build and load a large motor at a launching site, this has a number of drawbacks. Perhaps the greatest drawback of building a large, single piece motor is the difficulty which would be encountered if the motor is found to be defective for any reason. The propellant charges ordinarily used are of a thermosetting nature and could not be steamed out or otherwise removed in any known way. Such a motor could not be fired because of its defective nature and the almost certainty of an explosion, nor could it be moved because of its size. Thus, if a large defective motor were made, it would probably be necessary to abandon the area around it for a number of years. Further, such a large motor would be almost impossible to construct. For instnace, the cases for such motors much be very accurately made and heat treated and no facilities now exist for the fabrication of such cases. Further, it would be very difficult to mix the propellant, fill the case and inspect it.

The above difficulties are obviated by providing a rocket motor which is composed of a plurality of segments which can be assembled into a motor at the launching site. A motor made up of a series of segments has a number of advantages over a single piece motor. Some of the advantages follow:

A segmented motor can be made using facilities which were designed for relatively small rockets in the manufacturing of rocket motors of the largest conceivable size. This is applicable to the fabrication of the casing, to the compounding of the propellant charge, loading the propellant charge into the casing, curing it and inspecting the motor. The casing must be fabricated on metal fabricating equipment, employing rolling, welding and heat treating equipment and such facilities simply do not exist for casings of large size, while existing facilities are adequate for fabricating the casings for the segments of the present invention. Reliatively small mixers, either batch or continuous, can be used for mixing the propellant charge for the segments, since relatively small amounts are needed at one time. Similarly, filling and curing equipment of conventional design can be utilized in loading the relatively small segments.

Rocket motors are subject to rigid inspection and quality control and inspection is much simpler with segmented rockets. Small segments can be inspected for straightness, concentricity of cases and propellant and the like, while these opertaions would be quite difficult for a large rocket motor. Further, the propellant can be subjected to visual inspection at both ends of the propellant charge and one can see whether there is a good bond of the propellant to liner and of the liner to casing. Since the length is relatively short, visual inspection can be made throughout the length of the propellant charge without resorting to elaborate optical devices. The quality of the propellant is much easier to control when the batches are small and it becomes economically feasible to reject the relatively small batches used in filling a segment even if it is only slightly off specification.

The propellant used in solid fuel rocket motors are subject to rigid quantity-distance regulations to minimize explosive hazards and by keeping the amount of propellant in one place relatively small, the distances between operating buildings are reduced and plant operational safety is enhanced.

Rocket motors of the larger sizes contemplated herein could not be transported if made in a single piece. This means that single piece rockets must be made at the launching site and that it is impractical to store such rockets at a central depot and move them around as the occasion demands. On the other hand, when solid propellant rocket motors are made in accordance with the present invention, wherein a series of segments are used, the segments are easily transported and rocket motors of any conceivable size can be assembled at a launching site. The segments can be stored at a central point and moved from one point to another, as the situation demands.

When a large single piece rocket motor is made, it is difficult to keep it in readiness for an extended period of time. As has been pointed out previously, it is always difficult to inspect motors of large size, while a motor made in accordance with the present invention can be periodically disassembled, inspected and reassembled. If a defective segment is found, the single segment can be replaced and the defective segment disposed of. However, should a large motor develop a defect upon standing, disposal presents almost insurmountable problems, as has been pointed out above.

A large single piece rocket motor must be designed and built in a predetermined size. As will appear later, the present invention permits great flexibility, since a relatively small number of components can be assembled to form rocket motors of different sizes, depending upon the mission at hand.

The testing of large rocket motors involves extensive test facilities and each test is very expensive. On the other hand, as is later pointed out in detail, the most critical section of a segmented motor is the forward section, i.e., the section of smallest diameter. It is this segment of the motor in which the propellant is subjected to the highest stresses and in testing the forward segment of a tapered motor, one in effect tests the entire motor under its most rigorous operating conditions. Thus, where one might be tempted to rely upon relatively few tests of a large single piece motor, the same expenditure of time and money enables one to test a large number of forward sections, thus allowing the accumulation of data of some statistical significance. In this way, maximum economy and reliability are obtained.

In making large motors of single piece configuration, it is ordinarily impractical to use anything other than a charge which is homogeneous as to composition and which has the same configuration throughout its length. No such limitations exist with a segmented motor. Some of the segments can be filled with a charge of one configuration while other segments can be filled with charges of other configurations. Thus, one section can be made end burning, another segment can be made internal burning, while other segments may have slots, either circumferential or longitudinal. These may be combined in any desired combination. Further, as is set out hereinafter in greater detail, various propellant formulations can be used in the different segments. In a single piece motor, it is ordinarily impractical to use propellants of different formulations because of the difficulty of securing adequate bonds between the different propellants as well as the difficulties encountered because of lack of compatibility of different propellants when in contact with each other and also the difficulties occasioned by different coefficients of expansion between various propellants.

All of these difficulties are obviated by the segmented motor of the present invention, and one may employ propellants having radically different chemical compositions and burning characteristics in the different segments. For instance, a relatively cool-burning propellant can be used in an aft segment while higher temperature propellants, which are more desirable in many instances from an efficiency standpoint, can be used in forward segments and the relatively cool gas issuing from the low temperature propellant will serve to form an insulating coating over the nozzle of the hot gases issuing at the center, so that nozzle temperatures may be employed which are higher than the throat would normally stand. Further, by being able to select different propellants and different charge configurations within the different segments, one can achieve optimum mass flow rates throughout the length of a rocket without limitation as to size. Thus, the present invention allows complete flexibility in the construction of solid propellant rockets which has heretofore not been possible.

In order to have an efficient rocket, among other things the weight of the casing compared to the total weight of the rocket must be as low as possible. In a tapered rocket, it is not necessary that the wall thickness be as great in the forward segments as it is in the aft segments, since, for a given pressure, wall thickness must be greater as the diameter of the rocket increases. However, it is difficult to fabricate a long tapered case wherein the wall thickness varies throughout the length of the rocket. On the other hand, the segmented rocket provides an easy solution to this problem since the different segments can have different wall thicknesses, depending upon the requirement of that particular segment, so that each segment can be made with a casing thickness just sufficient for the needs of that particular segment. Moreover, since the segments are individually relatively short, in the segmented motor it is completely practical to have walls varying in thickness within a particular segment. Thus, the segmented rocket permits better employment of the material used in the casing. Although this saving is somewhat offset by the extra metal used at joint structures, it has been found that the joint structures do not add unduly to the weight of the completed rocket. It is also obvious that the several segments may utilize cases fabricated from different materials of construction in order to optimize the performance of the rocket.

If a large rocket were made, even in conical configuration, the charge itself would be subjected to large longitudinal stresses because of the maximum length of the propellant filling. In the segmented rocket, the individual segments are relatively short so that induced stresses are materially reduced. Thus, the segmented rocket can be more readily fabricated without stress failures and, further, is less subject to failure caused by expansion difficulties due to changes in ambient temperatures.

In the segmented motor, joints are used between the different segments, which are heavier than the balance of the casing. These external joints are advantageous in that they increase the stiffness of the finished rocket and increase its ability to support static loads, such as those imposed by the upper stages and/or the pay load of the rocket when it is in launching position. Further, the joints serve as protective bands on the rockets so that they are less subject to damage in handling and storage.

When the segmented motor, multiple igniters of either the conventional pyrotechnic or the surface type can be provided in a simple manner, so that over or under ignition is easy to avoid.

In the drawings forming part of this application.

Turning now to a description of the drawings by reference characters, there is shown in FIGURES 1 through 4 a rocket motor which is made up of eleven segments designated 10 through 20. Each of these segments has an outer casing as at 22, a filling of a propellant charge as at 24, said propellant charge having a burning surface as at 26. It will be noticed that the propellant charge has substantially the same web thickness throughout the length of the motor. Thus, when the motor is fired, the charge is ignited by means well known to those skilled in the art throughout its length and the charge burns through to the casing at all points at substantially the same time, resulting in a sharp tailoff of the thrust-time curve when this is desired.

In the embodiment shown in FIGURES 1 through 4, the front segment 10 has a substantially completely closed hemispherical nose 27 with an opening 28 for the insertion of a conventional igniting device, which is not illustrated, and which forms no part of the present invention. The aft segment of the motor 20 has an aft closure 30 and an opening 32 to which can be attached a nozzle in known manner. In the specific motor shown in FIGURES 1 through 4, the propellant charges of segments 10 through 15 fit tightly together so that there is substantially no burning between segments, which is achieved by means hereinafter described. In the aft segments, circumferential burning slots may be provided between the different segments as is illustrated by the slot 34 between segments 15 and 16. Additionally, longitudinal burning slots may be provided in segments 17 and 18, 19 and 20, as is shown at 36 and 38 in FIGURES 1 and 4. Where the longitudinal burning slots are provided, the walls are provided with additional insulation as at 40 and 42 to protect the walls. It will be understood that the exact configuration of the segments, including the circumferential and longitudinal burning slots, is for purposes of illustration only and that the motor can be made with more slots than those ilustrated or can be made entirely without slots, or with different combinations of slots.

It will be understood that by providing suitable end segments similar to segment 20, not all the segments illustrated need be employed. For instance, if one wished a smaller rocket one might employ only the first four segments or only the first eight segments or the like, and this is developed in greater detail in FIGURE 5.

Figure 1:
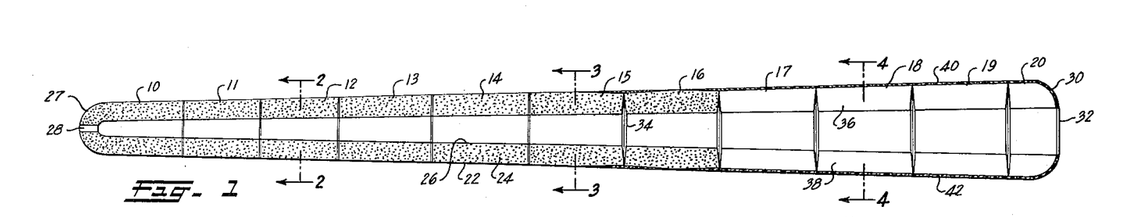
FIGURE 1 is an axial section of a rocket motor embodying the present invention.
Figures 2, 3, 4, 5:
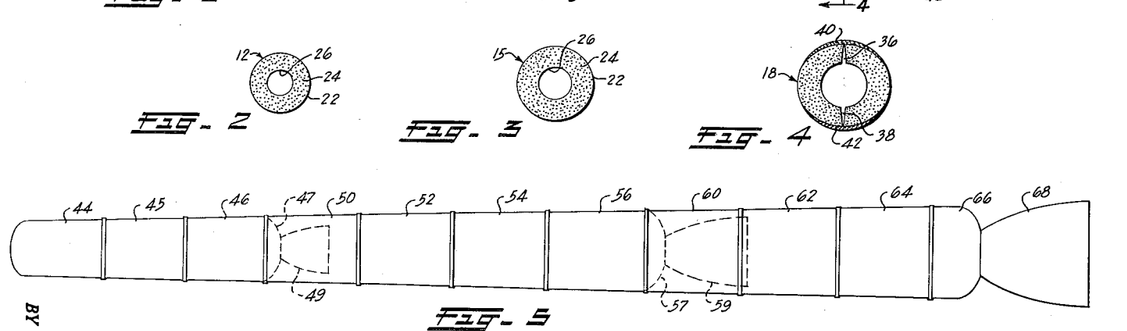
FIGURE 2 is a cross section on the lines 2—2 of FIGURE 1.
FIGURE 3 is a cross section on the lines 3—3 of FIGURE 1.
FIGURE 4 is a cross section on the lines 4—4 of FIGURE 1.
FIGURE 5 is a diagrammatic representation as to the manner in which rockets embodying the present invention can be made in various sizes using interchangeable components.

In FIGURE 5, there is shown in a diagrammatic manner the method by which rockets of various sizes can be assembled from standard components made in accordance with the present invention so that a rocket of any particular total impulse can be made depending upon the mission at hand. Thus, if one wishes a relatively small rocket, the forward segments 44, 45 and 46 would be provided with an aft section 47 and a nozzle 49. On the other hand, if one desired a rocket made of seven segments one would use the segments 44, 45 and 46, as before, with segments 50, 52, 54 and 46, to which would be added an aft section 57 and a nozzle 59. Further, if one desired a rocket of even greater total impulse, instead of the aft section 57 and nozzle 59, one could additionally employ the segments 60, 62 and 64 to which would be added aft section 66 and nozzle 68. It is thus apparent that the present invention gives great flexibility in that relatively few types of segments need be employed in order to provide rockets of widely varying total impulses.

Figure 6:
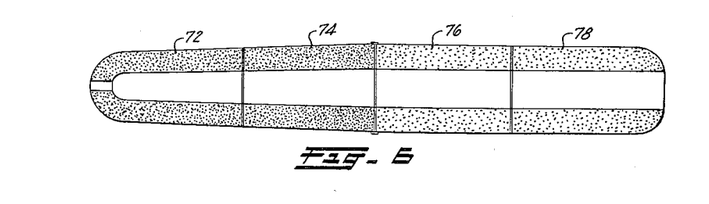
FIGURE 6 is an axial section view of a rocket embodying both conical and cylindrical segments.

In FIGURE 6 is illustrated a rocket motor having a forward conical segment 72, a second conical segment 74, a first cylindrical segment 76, and an aft cylindrical segment 78. Under some circumstances it may be desirable to employ tapered segments froward and cylindrical segments aft. Here the segments 72 and 74 are charged with a fast-burning propellant, while the segments 76 and 78 have a slow-burning propellant and an acceptable mass flow rate can be achieved with the cylindrical segments to the rear.

Figures 7, 8:
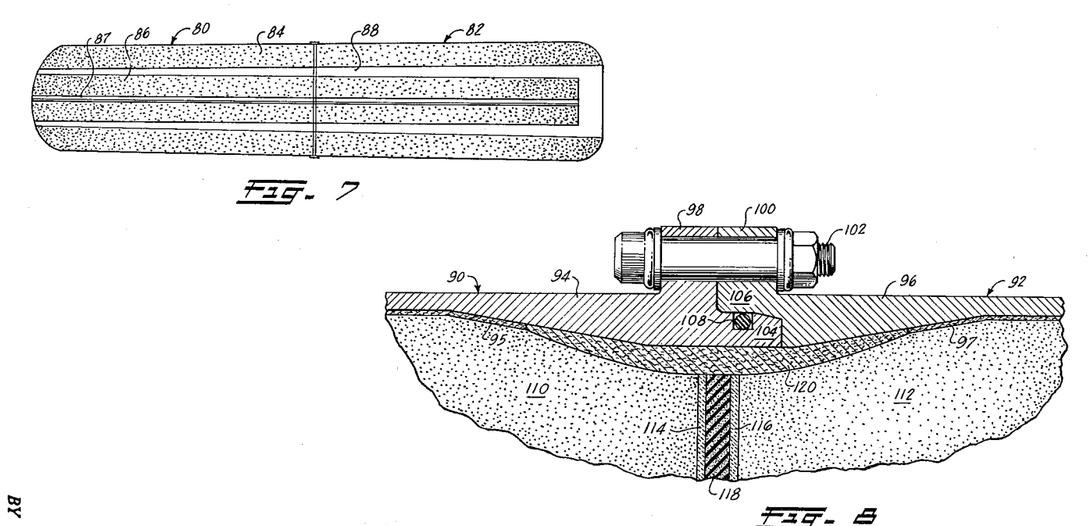
FIGURE 7 is an axial section of a rocket motor having a cylinder and tube propellant charge embodying the present invention.
FIGURE 8 is an enlarged sectional view of a portion of a joint between two segments embodying the present invention.

In FIGURE 7, there is illustrated one manner in which the present invention can be applied to a rocket having a propellant charge of a different shape. In this embodiment of the invention, a conical nose segment 80 is attached to a conical tail segment 82. The two segments are filled with a conventional tubular propellant charge 84, while at the center of the rocket there is a second charge in the form of a rod of propellant 86 with a reinforcing rod 87 therein. The rod segment 86 does not need to be tapered but may be cylindrical and the port area or gas passage 88 will be of increasing size towards the rear of the rocket due to the shape of the tubular propellant charge 84. The rod may or may not be segmented. It is obvious that this technique can be applied to rockets made in more than two segments and also that the same considerations will apply to interior charges of other configuration, such as when a star shaped charge is employed.

In FIGURE 8 there is illustrated one method whereby the various segments of a rocket can be joined together. This figure also illustrates the manner in which a restrictor substance can be bonded on the end of the propellant charge and also the manner in which the charge is insulated and wherein the flow of gas is kept from the walls of the rocket, particularly at a joint. According to this embodiment, a first segment 90 is joined to a second segment 92. Near the point of juncture the walls are thickened as at 94 and 96 and at the thickened portions mating flanges 98 and 100 are provided having a series of holes therein so that the flanges can be fastened together with a series of peripheral bolts 102. Further, segment 90 is provided with a tapered rim 104 mating with a complementary rim 106 on segment 92. These rims add strength to the joint and facilitate assembly. Additionally, an O-ring 108 may be employed for sealing. It will be understood that this merely illustrates one method of fastening the segments together and that other methods such as the use of shear pins, threaded joints, Ortman-type lock rings or various types of clamping rings may be employed to hold the mating segments together. It has been found that strong, satisfactory joints can be made without materially increasing the weight of the rocket over that of an unsegmented rocket. The theory of such joints is explained hereinafter.

FIGURE 8 also illustrates the manner in which the joints can be insulated and the manner in which one can prevent burning from the ends of the segments if this is desired. The segment 90 is provided with propellant charge 110 while segment 92 is provided with propellant charge 112. The propellant charges 110 and 112 have restrictor coatings 114 and 116, respectively, which may be a material such as is well known to those skilled in the art, such as a rubber-asbestos mixture, the restrictor being applied to the propellant charge at the time of manufacture. A pad of a resilient material, such as sponge rubber, 118, may be applied between the segments as they are assembled. It will be understood that in all cases it will not be necessary to employ the pad 118 since the insulation, hereinafter described, may be sufficient to keep excess heat from the joint. Further, the restrictor substances 114 and 116 need not be employed in all instances since burning may be desired from the ends of a charge as is illustrated at 34 in FIGURE 1.

In order to prevent excessive heat from reaching the joint, a pad of an insulating material 120 is normally employed at the joint. The insulation may be any suitable insulation material such as silica-filled or asbestos-filled buna rubber and it may or may not be consumable. The thick pad of insulation is joined to the normal casing insulation 95 and 97. In the embodiment illustrated, the propellant charges 110 and 112 are shaped to allow the insertion of the pad at the time of assembly, although the pad might be made in parts so that a section of the insulation would be a part of each of the segments being joined, while a center section of the insulation would be added at the time of assembly.

Figure 9:
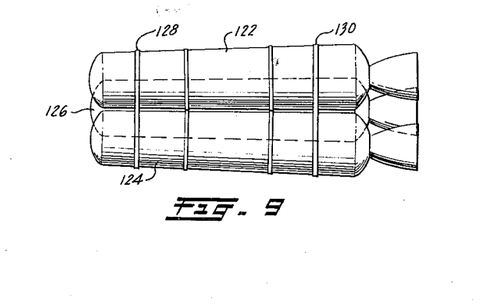
FIGURE 9 is a diagrammatic view showing the manner in which a plurality of motors embodying the present invention can be arranged in side-by-side or cluster relationship to give a motor of greater thrust.

In FIGURE 9, there is illustrated a method by which the rocket motors of the present invention may be placed in side-by-side or cluster arrangement relationship to provide a motor of greater thrust. Here the motors 122, 124 and 126 are held in a compact relationship by means of bands 128 and 130. It will be noted that each of the motors in turn is made up of three segments. Further, it will be obvious that such clustered motors can be combined with other motors to produce a multiple stage rocket as is illustrated in FIGURE 10.

Figure 10:
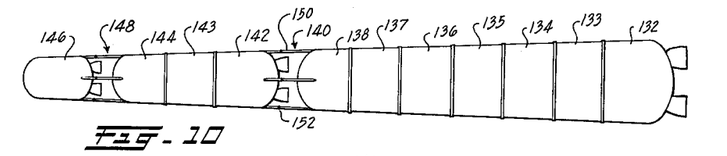
FIGURE 10 is a diagrammatic representation of a three-stage rocket embodying the present invention.

In FIGURE 10 is shown the manner in which a multiple-stage rocket can be made in accordance with the present invention. In accordance with this embodiment, the first stage consists of seven segments numbered 132 through 138. The first stage rocket motor is attached by the inter-stage structure, generally designated 140, to the second stage motor which consists of three segments 142, 143 and 144. The second stage is fastened to the first stage 146 by means of the inter-stage structure 148. FIGURE 10 is only for the purpose of providing an example and it is obvious that many other combinations are possible.

Figure 11:
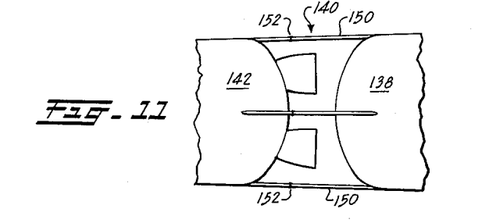
FIGURE 11 is an enlarged detailed view of a portion of FIGURE 10 showing diagrammatically the manner in which two stages of a rocket can be fastened together.

In FIGURE 11 there is shown in diagrammatic form the inter-stage structure 140 which may consist of the structure 150 connecting the segment 138 with the segment 142. Interposed in the structure 150 are explosive sections 152 which can be ignited by suitable means not illustrated, at the proper time to separate the stages.

Figure 12:
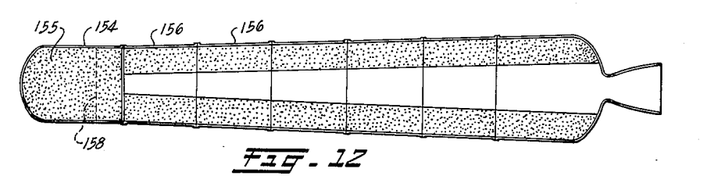
FIGURE 12 is a sectional view of a rocket embodying the present invention having an end burning section as one of its components.

In FIGURE 12 is shown an embodiment of the invention wherein an end burning segment is combined with a plurality of tapered segments. In accordance with this embodiment, the forward segment 154 is provided with an end burning charge 155 while the tapered segment 156 and continuing aft segments are made in accordance with the invention as elsewhere described. With such a structure, the charge 155 of segment 154 will burn only from the end and when the charges of the other segments 156 have burned through to the casing, the end burning segment will only have burned approximately to the dotted line 158. Thus, the segment 154 will continue to burn giving an additional but reduced thrust. In many applications, it is desired to have a rocket with a high thrust at first and with a relatively low sustained thrust thereafter. A rocket made in this configuration will achieve these results. It should be noted that, although the casing is protected only by thin insulation throughout the tapered segments at the time these segments burn out, the end segment burns under conditions whereby the chamber pressure is much lower than when all of the segments are burning, so that the exposed casing is able to withstand the lowered pressure during this period.

Figure 13:
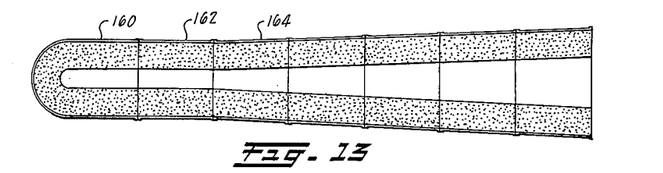
FIGURE 13 is a diagrammatic section of a rocket embodying some cylindrical and some conical sections.

In FIGURE 13 there is shown another manner in which cylindrical sections can be combined with tapered sections. The tapered rocket of the present invention finds its greatest advantage in rockets of large size and the taper ordinarily becomes more important towards the nozzle end. Thus, a rocket can be designed having a forward segment 160 and a second segment 162, both of which are of conventional cylindrical configuration. To this can be attached tapered segment 164 and so on. It is important that the velocity of the gas at the exit of the last cylindrical segment, i.e., between segments 162 and 164, not be above the critical velocity. In this manner, one or more cylindrical segments can be combined with one or more tapered segments.

Figure 14:
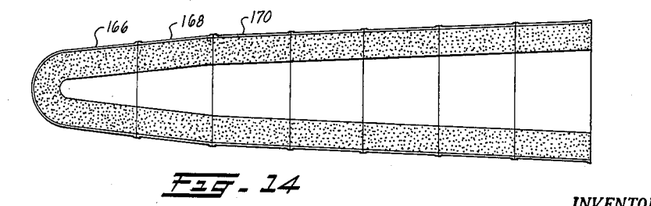
FIGURE 14 is a section of a rocket embodying the present invention wherein the segments have different tapers.

In FIGURE 14 there is shown a rocket motor wherein the angle of the taper varies from one segment to the next. In this particular embodiment, the taper of the first two segments 166 and 168 is substantially uniform but at segment 170 and thereafter the segments have different taper. It will be obvious that this situation might well have been reversed, i.e., the aft sections might have had the greater taper and/or different segments might have different degrees of taper.

Figure 15:
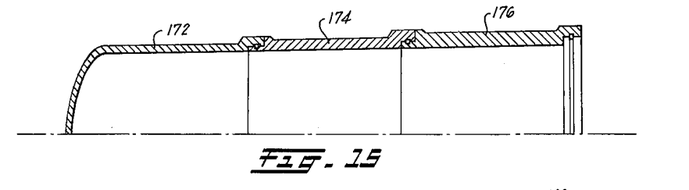
FIGURE 15 is a partial section of a rocket casing wherein the several segments have different casing thicknesses but wherein the thickness within any one segment remains constant.
Figure 16:
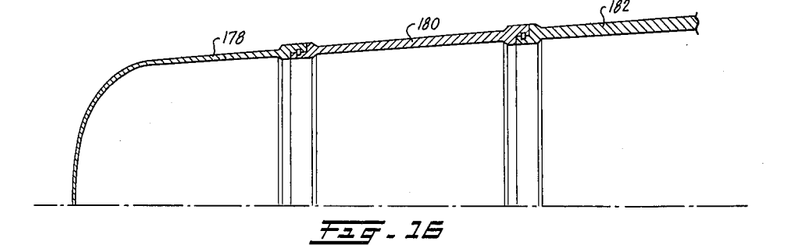
FIGURE 16 is a view similar to FIGURE 15 wherein the casing walls not only vary from one segment to the next but also wherein the walls taper within the individual segments.

In FIGURE 15 is shown in diagrammatic form how casings can be made wherein the segments have casing walls of differing thicknesses. As has heretofore been explained, the thickness of the casing with any given propellant must be greater as the diameter of the rocket increases. In other words, relatively small diameter segments can employ relatively thin walls while those segments of greater diameter require relatively thick walls despite the fact that the pressure is the same or, as is usually the case, is greater in the small diameter segments. In accordance with this embodiment, a forward segment 172 is combined with a second segment 174 and a third segment 176. The first segment 172 is substantially thinner than second segment 174, which in turn is thinner than segment 176. However, within any given segment the wall thickness is uniform. Thus, it is completely practical to make large solid fuel rockets having segments of varying wall thickness without the complication which would be introduced by employing plates for making the segment having a tapered cross section. However, it is entirely practical to make rockets in accordance with the present invention wherein there is a taper in the wall of the individual segments. Thus, in FIGURE 16 there is shown a casing for a rocket motor having a forward segment 178 which tapers from a relatively thin cross section to a relatively thick cross section, as is shown, which in turn is attached to segments 180 and 182, each of which may also be tapered as shown. It will be understood of course that the thickest portion of section 178 will be about equal to the thinnest section of 180 and so on. Since the individual segments are relatively short, it is practical to make them with walls of varying cross section thickness, while it would be extremely difficult to provide such a gradual taper in a large rocket casing made in a single piece.

Figure 17:
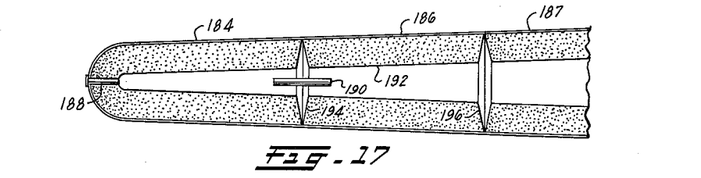
FIGURE 17 is a section of a rocket made in accordance with the present invention wherein an auxiliary igniter is used.

In FIGURE 17, there is shown a rocket having a plurality of segments, designated 184, 186 and 187. As has been mentioned earlier, one of the advantages of the segmented rocket is that auxiliary ignition devices can be used. With conventional rockets of single piece construction, it is only practical in most instances to employ a single ignitian device, such as that shown at 188. Although this is ordinarily satisfactory for rockets of small or moderate size, it becomes impractical with rockets of large size and it is difficult to provide a single igniter without danger of over or under ignition of the rocket. Conventional rocket igniters ordinarily consist of a pyrotechnic mixture which includes a finely divided metal. Upon ignition of the igniter, the metal particles and products of combustion are vaporized and propelled at high velocities into the port and cover the propellant surface. If insufficient igniter is used, the entire surface of the propellant charge will not be uniformly ignited so that the rocket will not commence to burn evenly. If too much igniter is employed, the surface of the propellant charge will be rendered irregular by the effects of the ignition products hitting it, and it will thus present a much larger burning surface than that for which the rocket was designed. It is obvious that in a large single piece rocket, it is difficult to secure the exact degree of ignition desired. However, with the segmented motor of the present invention, one or more auxiliary igniters, such as that designated 190, may be employed, and it will be obvious that it is easier to secure uniform ignition throughout the length of the rocket by a series of relatively small igniters of either the conventional or surface type than it is with a single large igniter placed at one end.

FIGURE 17 also illustrates the manner in which some of the charges in the rocket can consist of segments which burn at their ends as well as at the center. Thus, in FIGURE 17, and referring particularly to segment 186, the burning surface is presented not only at the center, 192, of the segment, but also at the ends of the segment at 194 and 196.

Figure 18:
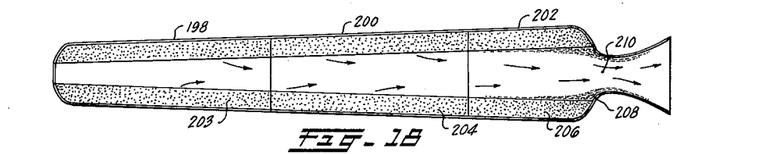
FIGURE 18 is a section of rocket embodying the present invention wherein the several segments have propellant charges of different combustion temperatures.

FIGURE 18 illustrates the manner in which it is practical to employ propellants of different burning characteristics in a multiple segment rocket and particularly to employ propellants which burn at such high temperatures that they ahave heretofore been impractical. As has been pointed out previously, it is ordinarily impractical to provide propellants of different characteristics in different portions of a single piece rocket because of differences in coefficient of expansion, the difficulties of bonding the propellants to each other, and the possible incompatibility of the different propellants. Further, it is desirable to have a propellant in a rocket having the highest possible specific impulse and the specific impulse varies as the square root of the tempertaure at which the propellant burns divided by the molecular weight of the combustion products. Thus, other conditions being equal, the higher the burning temperature, the higher the specific impulse and the greater the efficiency of the rocket. However, rocket propellants are known which have burning temperatures well above the permissible temperature which can be permitted by any known materials of construction for rocket nozzles. Thus, the employment of many otherwise suitable propellants is rendered impossible since rocket nozzles cannot be constructed to withstand the temperature generated. However, all of these difficulties are obviated with the multiple segment rocket. In FIGURE 18, three segments are employed, namely 198, 200 and 202. The forward segments, 198 and 200, are filled with a propellant which burns at a relatively high temperature, as at 203 and 204. By way of example, this propellant might be polybutadiene acrylic acid with ammonium perchlorate and aluminum powder. The segment 202 is provided with a propellant mixture 206, which burns at a substantially lower temperature than the propellant mixtures 203 and 204. By way of example, this propellant might be butadiene methylvinyl pyridine with ammonium nitrate. Since the segment 202 is the aft segment, the gases issuing from it tend to channel along the walls of the throat, as at 208, while the gases from the high temperature propellants, 203 and 204, are channeled near the center of the throat, as at 210, so that they do not actually come in contact with the throat. In this manner, the multiple segment rocket enables one to make practical use of high temperature propellants which heretofore have only been of academic interest.

Figure 19:
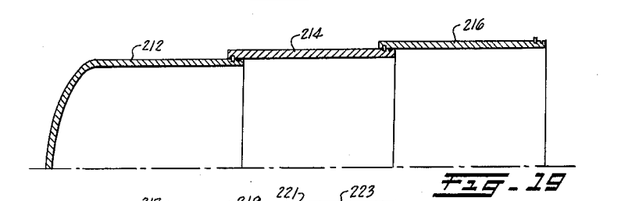
FIGURE 19 is a partial section of a rocket casing wherein the several segments are joined in an overlapping relationship in order to achieve a tapered effect.

FIGURE 19 illustrates the manner in which a tapered segmented rocket can be made wherein the individual segments are cylindrical. Here, the aft segment 216 overlaps the second segment 214, which in turn overlaps the forward segment 212 and so on. Each successive segment thereby becomes larger in diameter by twice the thickness of the casing. Thus, a tapered rocket motor is provided which is easy to fabricate since each of the individual segments is cylindrical.

Figure 19A:
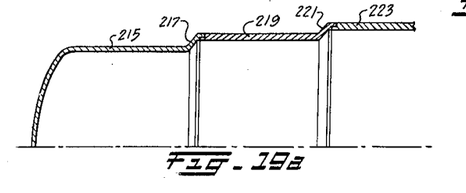
FIGURE 19A is a partial section of a casing showing an alternate form of structure.
Figure 20:
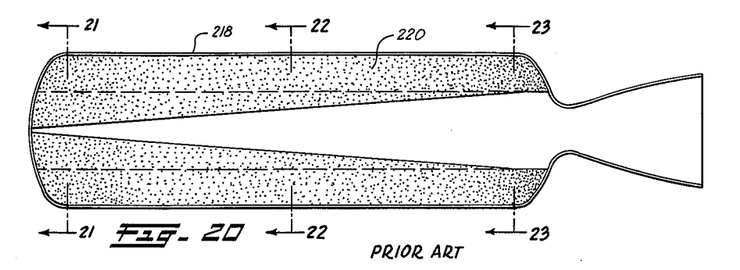
FIGURE 20 is an illustration of a prior art rocket wherein a star-shaped propellant charge is used in an effort to achieve a uniform gas flow throughout its length.
Figure 21:
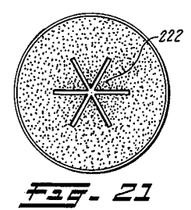
FIGURE 21 is a section on the lines 21—21 of FIGURE 20.
Figure 22:
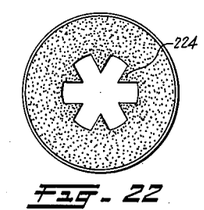
FIGURE 22 is a section on the lines 22—22 of FIGURE 20.
Figure 23:
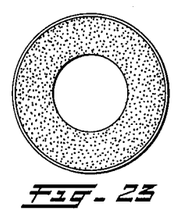
FIGURE 23 is a section on the lines 23—23 of FIGURE 20.
Figure 24:
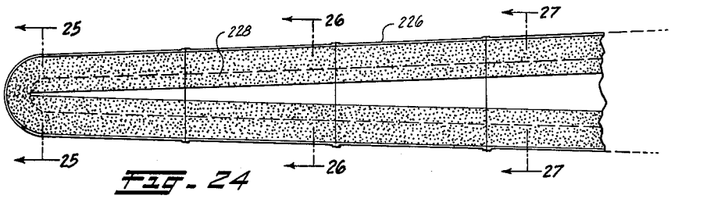
FIGURE 24 is a diagrammatic representation of a rocket embodying the present invention having a star perforation in the propellant charge.
Figure 25:
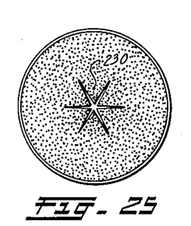
FIGURE 25 is an enlarged section on the lines 25—25 of FIGURE 24.
Figure 26:
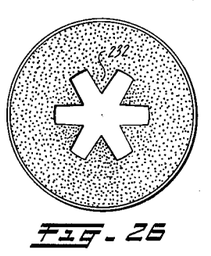
FIGURE 26 is an enlarged section on the lines 26—26 of FIGURE 24.
Figure 27:
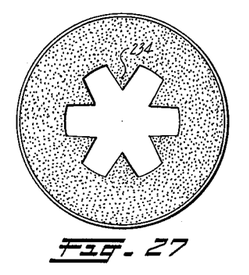
FIGURE 27 is an enlarged section on the line 27—27 of FIGURE 24.

In FIGURE 19A another method by which a tapered, segmented rocket can be made employing generally cylindrical segments is shown. Here a forward section 215 has a shoulder 217 thereon which is attached to the second segment 219 which also has a shoulder 221 thereon. Shoulder 221 is attached to the segment 223. Although the shoulders have been illustrated as flaring outwardly, it is obvious that they could also flare inwardly or be made as separate elements.

In FIGURES 20 through 27, there is contrasted how a star shaped charge may be employed in a cylindrical rocket, made in accordance with the prior art, with a similar configuration in a tapered rocket made in accordance with the present invention. The purpose of these figures is to show that, although the star shaped charge can be used effectively in cylindrical rockets of relatively small size to secure reasonably optimum mass flow rates throughout the length of the rocket, the method is not applicable to rockets of large size. On the other hand, rockets made in accordance with the present invention can employ such a configuration to produce rocket motors of any desired size. Thus, referring to FIGURES 20 through 23, there is shown a rocket having a cylindrical casing 218, having a propellant charge of a star shaped configuration 220 therein. As will be most easily seen from the sections below, the points 222 of the star are quite large at the forward end of the rocket, have become smaller, as at 224, in the center of the rocket, and have completely disappeared near the throat of the rocket, as in FIGURE 23. On the other hand, with the tapered rocket shown in FIGURES 24 through 27, a tapered casing 226 is employed which may be divided in segments, as is shown, having a star shaped propellant charge 228 therein. However, the star points at the forward end of the rocket, 230, are of exactly the same height as are the star points 232 near the midpoint of the rocket and the points 234 at a point even further remote from the nose. Thus, the tapered rocket can be made in any conceivable length employing a star shaped propellant charge, and does not suffer from the size and other limitations imposed in the design of a cylindrical rocket motor.

Figure 28:
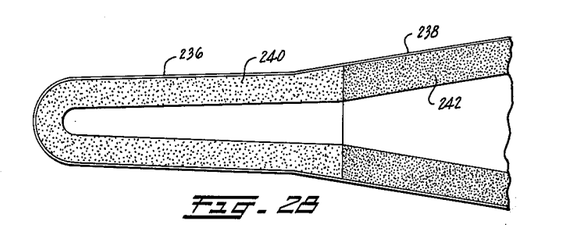
FIGURE 28 is a section of a tapered, segmented rocket having segments of different tapers and having propellant webs of different thicknesses.

In FIGURE 28, there is illustrated in diagrammatic form a segmented rocket motor further illustrating that the angle of the taper need not be uniform throughout the length of the rocket, and also the manner in which the present invention enables one to use propellant charges having different burning rates. According to this embodiment, a forward segment 236 is employed having a relatively slight taper and to this is attached a second segment 238 having a greater angle of taper. The segment 236 is filled with a relatively thin web 240 of a relatively slow-burning propellant charge, while the segment 238 is filled with a relatively thick web 242 of a relatively fast-burning charge. It will be understood, of course, that the thickness and burning rate of the two propellant charges 240 and 242 could be selected so that both charges would burn through to the casing at substantially the same time. This provides another example of the flexibility of selecting propellant charges and configurations permitted by the present invention.

As has been pointed out earlier, the present invention also embodies a novel method of fastening casing sections together whereby a coupling method is provided which enables one to minimize the weight of the joint structure. If one attempted to join two segments of a rocket casing together by means of a conventional coupling, such as a riveted metal band, the joint would obviously have more rigidity than the balance of the casing. Then, when the casing was subjected to internal pressure due to the ignition of the propellant charge, the joint would tend to expand relatively little from the pressure, while the balance of the walls of the casing would expand much more, giving the casing an hourglass configuration. Naturally this introduces a bending moment at the joint so that to provide the necessary strength, the walls of the casing itself would have to be thickened at the joint and this thickening must extend for a substantial distance along the wall of the casing. A second bending moment in the opposite direction is caused by the displacement outward of the neutral axis. It has been found that by the proper design of a joint, allowing for eccentricity and rotation of the joint, these two bending moments can be caused to cancel each other and that by such design the rocket casing will not take on the hourglass configuration but rather the outward displacement at the joint can be made substantially the same as the outward displacement throughout the balance of the casing. Thus, although the walls of the casing are displaced outwardly upon the application of pressure, the joint is displaced to the same degree and the walls of the adjoining segments and the joint remain substantially undistorted.

Figure 29:
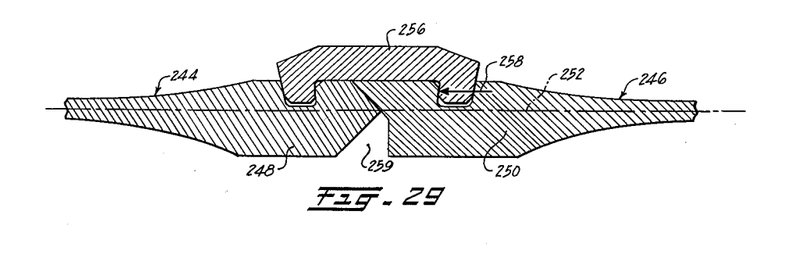
FIGURE 29 is an enlarged section showing how two segments may be joined together.
Figure 30:
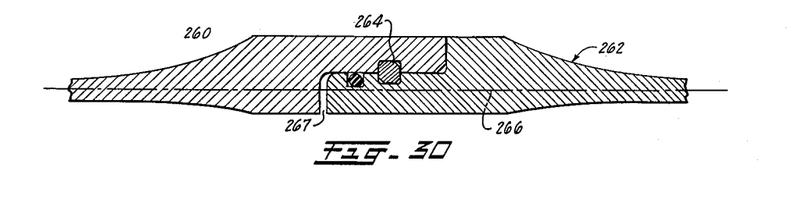
FIGURE 30 is a view similar to FIGURE 29 showing a different method of fastening segments together.

FIGURES 29 and 30 illustrate typical methods by which this can be accomplished. In FIGURE 29, a first segment of a casing 244 is joined to a second segment 246. The segment 244 is thickened as at 248 and the segment 246 is thickened as at 250, but it will be observed that the thickening does not extend far on each side of the joint. In this figure, the neutral axis is shown by the dashed line 252. In this embodiment of the invention, a locking ring 256 is provided which exerts its force on the line shown by arrow 258. A relieved portion as at 259 permits a turning moment. By applying the holding force on a line outside of the neutral axis and by properly proportioning the parts, the two axial bending moments will counteract each other so that the casing segments and joint will remain flat as expansion caused by the pressure within displaces them outwardly.

FIGURE 30 shows another method of accomplishing this wherein the two segments 260 and 262 are held together by a locking ring 264 fitting in grooves of the two segments. The neutral axis is shown at 266 and the mating parts are relieved at 267. It will be noted that in both FIGURES 29 and 30, the forces holding the two segments together are applied at a point outwardly from the neutral axis so that the proper bending moment is introduced in each case.

Figure 31:
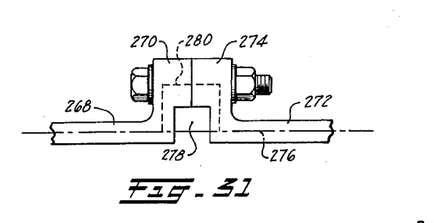
FIGURE 31 is a diagrammatic view illustrating the principle behind the novel method of joining segments.

In FIGURE 31 there is illustrated graphically the theory behind the joining of segments together in this manner. Here the segment 268 is provided with a shoulder 270 while a segment 272 is provided with a shoulder 274. The neutral axis is shown by the dashed line 276. It is obvious that this line passes through the recessed area 278. Thus, the force between segments must be generally along the dotted line 280 which lies outside of the neutral axis.

It will be understood that the descriptive matter and drawings are only for the purpose of illustrating various aspects of the invention and that a great variety of combinations of rockets can be made following the principles herein set forth. By the use of segmented tapered sections, one achieves almost complete flexibility in design so that rocket motors can be tailored to almost any desired burning characteristic, which has heretofore been considered impossible. It now becomes much easier to design a neutral burning motor, i.e., one having a constant thrust throughout its burning time, or to design a motor which departs from neutral burning when this is desired. The taper of various sections can be varied, cylindrical sections can be combined with tapered sections, and the various sections may have propellant charges having different characteristics and thicknesses, as well as different configurations. Slots can be placed at any point desired and one is not limited to having burning slots located near the orifice. One can achieve any desired pressure drop throughout the rocket and can have substantially the optimum mass flow rate at all points within the rocket motor.

One particularly advantageous feature of the present invention is the ease of testing tapered segments as contrasted with the testing of single piece rockets. In the tapered segmented rocket, the most critical section is the forward section since here the diameter is the smallest, introducing the most severe problems with respect to contraction and expansion which can possibly cause cracking of the charge, both in storage and in firing. In a cylindrical rocket, gas conditions become worse near the discharge end of the motor since there is more gas and it is moving at a higher rate of speed. On the other hand, with a tapered rocket wherein gas conditions are substantially uniform throughout the motor, a test of the forward segment with a nozzle using a full size joint is equivalent to a test of the entire full-scale rocket. Thus, for a given expenditure of funds, one can test a large number of forward segments and obtain data of statistical significance. However, if it were necessary to test only full size rockets in their entirety, a less thorough testing program would of necessity be employed for economic reasons.

Throughout the specification, frequent reference has been made to a tapered rocket. The taper may be uniform throughout the length of the segmented motor or it can vary throughout the length of the motor as a whole or even within a given segment. However, for ease of manufacture it is generally preferred that each segment be in the form of a truncated cone. The optimum cone half angle (the cone half angle of the tapered motor is the angle which the wall of the case makes with the center line of the motor) will be a function of the internal flow conditions, the propellant properties, the propellant configuration and other design factors of the rocket. For instance, some propellants have greater mechanical strength than others or are more subject to erosive burning. More taper would be used with those propellants which are physically weak or which have a tendency towards erosive burning than with those which are stronger. Generally speaking, the cone half angle will be at least ¼ degree and may be as much as several degrees.

The invention is not dependent upon the use of any particular solid propellant and any of the conventional double base or composite propellant systems, such as those employing fuel-binders such as polyurethane, polybutadiene acrylic acid, carboxylated butadiene acrylonitrile and the like can be used in conjunction with conventional oxidizers such as ammonium perchlorate or ammonium nitrate with or without the addition of finely divided metals.

We claim:
1. A segment adapted for use in constructing a rocket motor comprising a casing in the form of a right truncated cone, said casing having a forward end and an aft end, said forward end being smaller than said aft end, said casing having a propellant grain therein, said grain having a central conical opening therethrough forming a combustion zone, the inner surface of said grain being substantially parallel to said casing whereby the grain has a substantially constant web thickness, said segment having means on said aft end and said forward end for fastening the segment to a mating rocket engine component.

2. A rocket motor comprising a plurality of segments, each segment having a casing with a propellant grain therein, each of said grains having a central opening throughout its length, the inner surface of said opening being generally parallel to the walls of the casing, said segments comprising at least a first segment and a second segment, the propellant grains of the several segments having substantially the same web thickness, the propellant grains in adjacent segments fitting together whereby the central openings of the grains form a substantially single central passage running the length of the segments, at least one of said segments being tapered so that it is larger at its aft end than at its forward end, and means for fastening said segments together in end-to-end relationship, the assembled segments having a substantially constant grain web thickness.

3. The motor of claim 2 wherein at least one segment has a half angle of at least ½°.

4. The motor of claim 2 wherein the central opening of the grains is partially filled by a central rod of propellant extending the length of the motor.

References Cited in the file of this patent
UNITED STATES PATENTS

| | | |
|---|---|---|
| 1,102,653 | Goddard | July 7, 1914 |
| 2,206,809 | Denoix | July 2, 1940 |
| 2,422,720 | Eksergian | June 24, 1947 |
| 2,500,117 | Chandler | Mar. 7, 1950 |
| 2,600,678 | O'Neill | June 17, 1952 |
| 2,724,237 | Hickman | Nov. 22, 1955 |
| 2,750,887 | Marcus | June 19, 1956 |
| 2,763,127 | Golden | Sept. 18, 1956 |
| 2,898,856 | Lightbody et al. | Aug. 11, 1959 |
| 2,939,396 | Adelman | June 7, 1960 |
| 2,964,209 | Eddy | Dec. 13, 1960 |

FOREIGN PATENTS

| | | |
|---|---|---|
| 158,405 | Austria | Apr. 10, 1940 |
| 859,352 | France | June 3, 1940 |
| 1,058,495 | France | Nov. 4, 1953 |
| 1,003,516 | Germany | Feb. 28, 1957 |
| 659,758 | Great Britain | Oct. 24, 1951 |

OTHER REFERENCES

A Quasi-Morphological Approach to the Geometry of Charges for Solid Propellant Rockets: The Family Tree of Charge Designs, by J. M. Vogel, published in Jet Propulsion, vol. 26, No. 2, pages 102–105, February 1956.

"Recent Advances In Solid Propellant Grain Design," A.R.S. Journal, July 1959, pages 483–491, vol. 29, no. 7.

A.P.C. Application of Zwerina, Serial No. 159,143, published June 8, 1943.